United States Patent [19]

Steipe et al.

[11] Patent Number: 4,740,989
[45] Date of Patent: Apr. 26, 1988

[54] PLANT FOR PRODUCING STEEL FROM SCRAP

[75] Inventors: Othmar Steipe; Harald Berger, both of Linz, Austria

[73] Assignee: Voest-Alpine Aktiengesellschaft, Linz, Austria

[21] Appl. No.: 23,692

[22] Filed: Mar. 9, 1987

[30] Foreign Application Priority Data

Mar. 17, 1986 [AT] Austria .................................. 695/86

[51] Int. Cl.$^4$ ............................................ H05B 11/00
[52] U.S. Cl. .......................................... 373/2; 373/18; 373/78
[58] Field of Search ....................... 373/1, 2, 24, 60, 78, 373/18, 22

[56] References Cited

U.S. PATENT DOCUMENTS 3,610,795 10/1971 Antoine .................................. 373/78
4,309,170 1/1982 Ward ..................................... 373/24

FOREIGN PATENT DOCUMENTS 323778 7/1975 Austria .
344215 7/1978 Austria .
2061677 8/1972 Fed. Rep. of Germany .
2418109 7/1975 Fed. Rep. of Germany .
2504933 7/1975 Fed. Rep. of Germany .
2261343 9/1975 France .
2396252 1/1979 France .

Primary Examiner—Roy N. Envall, Jr.
Attorney, Agent, or Firm—Hopgood, Calimafde, Kalil, Blaustein & Judlowe

[57] ABSTRACT

A plant for the production of steel from scrap and optionally fluxes includes a shaft furnace section having a bottom to receive a liquid sump of premelt and heating means laterally entering into the lower part of its interior. A hearth type furnace section is integrally connected with the shaft furnace section, into which the premelt is transferable from the shaft furnace section.

In order to produce steel from scrap without addition of pig iron and with an energy supply as low as possible, the lower part of the shaft furnace section is designed to diverge downwardly with respect to the upper part receiving the scrap column, the heating means disposed in this lower part are designed as plasma burners, the hearth type furnace section follows immediately upon the lower part of the shaft furnace section, and the hearth type furnace section includes at least one further heating means operated with electric energy for the treatment of the premelt transferred from the sump of the shaft furnace section, in particular an electric arc aggregate.

13 Claims, 2 Drawing Sheets

PLANT FOR PRODUCING STEEL FROM SCRAP

The invention relates to a plant for the production of steel from scrap and optionally fluxes, comprising a shaft furnace section including a bottom to receive a liquid sump of premelt and heating means laterally entering into the lower part of its interior, and a hearth type furnace section integrally connected with the shaft furnace section, into which the premelt is transferable from the shaft furnace section.

An assembly of this type is known from Austrian Pat. No. 344.215. There, the premelt collecting in the sump gets into the hearth type furnace via an electromagnetic counterflow channel, wherein the bath level in the hearth type furnace section is kept higher than that of the sump in the shaft furnace section such that the slag formed in the hearth type furnace section flows in the direction towards the shaft furnace section in counterflow to the melt and is extracted there. The hearth type furnace section is designed in the manner of an oxygen top-blowing converter, so that it is necessary for the production of steel to charge pig iron into the shaft furnace section in addition to scrap.

The electromagnetic channel, by the aid of which a large reaction surface is to be obtained between melt and slag, has disadvantages inasmuch it is cumbersome in construction and subject to failures.

With the known assembly, the molten steel is allowed to continuously run out via a siphon, which is disadvantageous inasmuch the composition and the temperature of the steel may change over the period of running out. Moreover, temperature losses are involved. It is absolutely necessary to further treat the thus produced steel in a subsequently arranged aggregate prior to tapping.

The invention aims at avoiding these disadvantages and difficulties and has as its object to provide a plant of the initially defined kind, by which steel is to be produced from scrap without addition of pig iron and with an energy supply as low as possible, and which is to be as compact as possible so as to offer the possibility of discontinuous tapping by tilting. In particular, it is to be possible to produce a castable steel in charges, which does not require any secondary treatment.

In accordance with the invention, this object is achieved in that the lower part of the shaft furnace section is designed to diverge downwardly with respect to the upper part receiving the scrap column, the heating means disposed in this lower part are designed as plasma burners, the hearth type furnce section follows immediately upon the lower part of the shaft furnace section, and the hearth type furnace section includes at least one further heating means operated with electric energy for the treatment of the premelt transfered from the sump of the shaft furnace section, in particular an electric arc aggregate.

Preferably, an overflow weir is provided between the lower shaft furnace section and the hearth type furnace section, whereby it is possible to retain a sump of low height in the shaft furnace section so as to provide for a good contact with a bottom anode in case D.C. plasma burners are provided.

Suitably, the bottom of the hearth type furnace section is positioned deeper than the bottom of the shaft furnace section, whereby a larger amount of premelt which corresponds to one charge, is capable of being collected in the hearth type furnace section in a manner that the melting operation of the shaft furnace section may be realized continuously, yet the treatment of the premelt in the hearth type furnace section may be effected discontinuously, i.e., by charges.

According to a preferred embodiment, a plurality of plasma burners is arranged to be distributed about the periphery of the lower part of the shaft furnace section, which plasma burners are axially displaceable and pivotable, and there is provided an additional plasma burner towards the region of the overflow weir, preferably at an angle of inclination of from 50° to 80°, in particular 70°. This enables the optimum introduction of heat into the scrap. The additional plasma burner in the region of the overflow weir, moreover, cares for sufficient overheating of the sump in order that the premelt does actually flow over the overflow weir.

Preferably, the whole aggregate consisting of the shaft furnace section and the hearth type furnace section is tiltable perpendicular to a horizontal axis connecting the center of the shaft furnace section with the center of the hearth type furnace section, wherein, suitably, the aggregate is positioned on a tilting cradle, tapping of steel in charges from the hearth type furnace section, thus, being feasible in a simple manner.

To this end, the hearth type furnace section suitably comprises a bottom tap for the steel, which is eccentrically arranged in the tilting plane laid through the center of the hearth type furnace section, and a working door provided in a side wall for extracting the slag.

In order to be able to carry out a refining process, if necessary, an oxygen blowing lance advantageously may be introduced to blow refining oxygen into the hearth type furnace section.

A preferred embodiment is characterized in that both the lower part of the shaft furnace section and the hearth type furnace section have interiors that are circular in cross section, the interior of the shaft furnace section, in ground plan, being approximately tangent to the interior of the hearth type furnace section or slightly intersecting with the same and the transition from one interior to the other being narrowed.

The invention will now be explained in more detail by way of one embodiment illustrated in the drawings, wherein.

Figure 1:
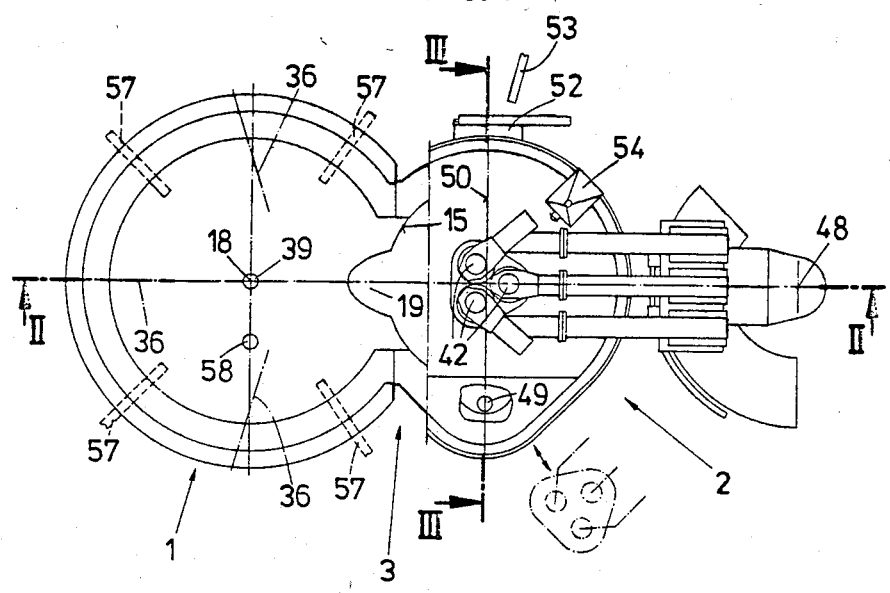
FIG. 1 is a partially sectioned ground plan of the plant.
Figure 3:
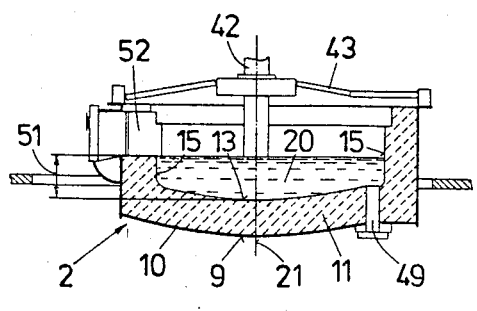
FIG. 3 illustrates a vertical section according to line III—III of FIG. 1.

The overall plant comprises an aggregate 3 comprised of a shaft furnace section 1 and a hearth type furnace section 2 integrally connected therewith. It is supported relative to the base 7 by means of tilting cradles 4, 5, 6. In sum, three tilting cradles 4, 5, 6 are provided, two tilting cradles 4, 6 being provided on the borders and one tilting cradle 5 being arranged centrally at the transition from shaft furnace section 1 to hearth type furnace section 2. Two tilting cradles 4, 5 are rigidly connected by means of crossgirders 7', the third tilting cradle 6, which is arranged on the border of the hearth type furnace 2 is hinged to the part comprised of the rigidly connected tilting cradles 4, 5 by means of an articulation 8 in order to allow for expansions and excursions.

The bottom 9 of the aggregate 3 is formed by a plate armor 10 inwardly provided with a refractory lining 11.

It comprises two adjacent bottom depressions 12, 13, one depression 12 being allocated to the shaft furnace section 1 and the second depression 13, which is in connection with the first depression via an overflow weir 14, is allocated to the hearth type furnace section. The refractory lining 11 is drawn higher in the region of the hearth type furnace section 2 and, thus, forms side walls 15 for the hearth type furnace section 2, integrally connected with the bottom 9.

As is apparent from FIG. 1, both bottom depressions 12, 13 are circular in ground or plan view section. The interiors 16, 17 formed by the bottom depressions 12, 13, of the shaft furnace section 1 and of the hearth type furnace section 2 contact each other approximately like tangents. The overflow weir 14 is arranged on the point of contact and is laid through a recess 19 provided in the refractory lining 11 of the hearth type furnace section 2 and projecting towards the center 18 of the shaft furnace section 1 in the direction to the center 18 of the shaft furnace section 1. The bottom depression 13 of the hearth type furnace section 2 is disposed deeper than the bottom depression 12 of the shaft furnace section 1 so that the hearth type furnace section is able to receive a whole charge of melt 20 without reaching the level of the overflow weir 14.

Figure 2:
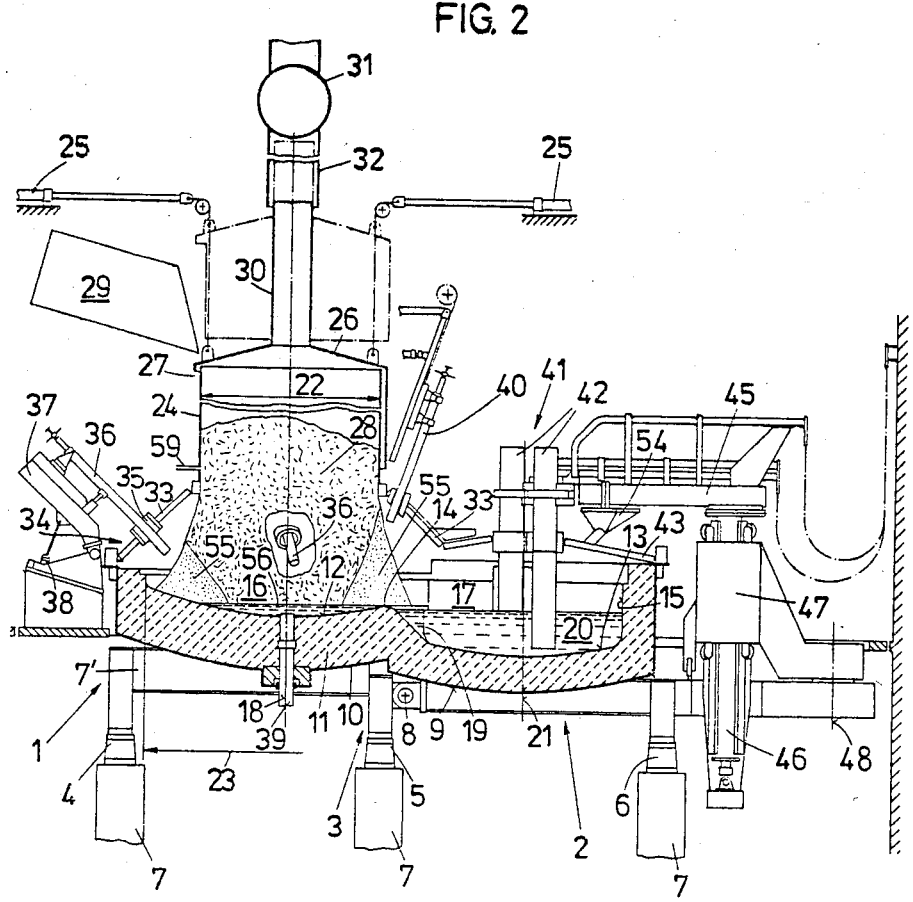
FIG. 2 is a vertical section according to line II—II of FIG. 1.

As is apparent from FIGS. 1 and 2, the aggregate 3 is tiltable perpendicular to a horizontal axis connecting the center 18 of the shaft furnace section 1 with the center 21 of the hearth type furnace section 2.

The shaft furnace section 1 has a cylindrical shaft part 24 of a diameter 22 smaller than the diameter 23 of its bottom depression 12 and formed by a metal shell. On the upper end of the shaft part 24, a hood 26 to be liftable and lowerable by a pressure medium cylinder 25 is arranged, comprising a recess 27 on one side such that, with the hood 26 lifted as illustrated in FIG. 2 by dot-and-dash lines, a charging opening is cleared to charge scrap 28 by means of a scrap chute 29. In the center of the hood 26, an offgas gas exhaust pipe 30 is provided, which enters into a concentric stationary discharge pipe 32 of larger diameter, which is connected to a suction draught 31.

The shaft furnace section 1, on its lower end, is provided with a downwardly diverging lower part 34 formed by a water-cooled shell 33. This diverging lower part 34 includes openings 35 disposed on the frustoconical shell 33, through which plasma burners 36 directed obliquely towards the bottom depression 12 project into the interior of the shaft furnace section 1. With the embodiment illustrated, D.C. plasma burners are provided, which are mounted on brackets 37. The plasma burners 36 are axially displaceable in the direction towards the bottom 9 and opposite thereto and are pivotable by slight angular degrees by a pivoting means 38. Thus, with the embodiment illustrated, the inclination of the plasma burner axis relative to the horizontal is adjustable between 30 and 60° and the lateral inclination likewisely may be altered, as is apparent from FIG. 1. A bottom anode 39 arranged in the center 18 of the shaft furnace section 1, which may be omitted if A.C. plasma burners are used, is carefully insulated with respect to the plate armor 10 and provided with an insulation monitor (not illustrated).

On the transition from shaft furnace section 1 to hearth type furnace section 2, a further plasma burner 40 is provided, which is positioned steeper than the plasma burners 36 pivotably provided in the shell of the diverging lower part 34. This plasma burner 40 preferably is just longitudinally displaceable, but not pivotable. Its inclination with respect to the horizontal amounts to between 50° and 80°, preferably 70°. It is directed approximately towards the overflow weir 14.

The hearth type furnace section 2 is equipped with an electric heating means 41, which, in the embodiment illustrated, is designed as an electric arc heater whose electrodes 42 are led through the lid 43. Instead of the electric arc heater, an inductive heating means may be provided. The electrodes 42 are liftable and lowerable on an electrode retainer 45 reaching as far as laterally beside the furnace and mounted on a column 47 via a lifting means 46, and are laterally pivotable about a pivot axis 48.

The hearth type furnace section 2 comprises a bottom tap 49 arranged eccentrical with respect to the center 21 of the hearth type furnace section 2, the eccentricity being in the direction of the tilting plane 50 laid through the center 21. In a side wall 15, a working door 52 for slagging is arranged in a tilting plane laid through the center, provided at a distance 51 from the bottom depression 13. Through this working door 52 provided in the tilting plane 50 laid through the center 21, an oxygen blowing lance 53 may be introduced, if desired, to blow refining oxygen into the hearth type furnace section 2. To add alloying elements, a funnel 54 is provided in the water-cooled lid 43 of the hearth type furnace section 2.

The functioning of the plant will now be described by way of one example of melting steel.

In a plant having a melting capacity of 40 t/h, the shaft furnace section contains at least 100 t of scrap 28. Unalloyed scrap 28 of a maximum piece size of 1.5 m length and weights per piece of 2 tons at the most is charged into the shaft furnace section via the scrap chute 29 in partial amounts of 10 tons. The used scrap—since it is external scrap throughout—varies in its chemical composition. There is a limitation only in regard of its fine portion (10% fine chips at most). The scrap 28, in the shaft furnace section 1, forms a column departing from the bottom depression 12 and is melted in the lower part 34 by the plasma burners 36, which are operated with argon and oxygen.

The plasma jets of the plasma burners 36 and 40 burn cavern-like cavities 55 into the column formed by the scrap 28. In the bottom depression 12 of the shaft furnace section 1, which is formed relatively shallow, a sump of molten scrap 28, in the following called premelt 56, is formed over a slight height up to the upper edge of the overflow weir 14. To promote the melting process, naturalgas oxygen burners 57, as indicated in FIG. 1 by broken lines, may be provided at approximately the same level as the plasma burners 36 and therebetween.

The inclination of the plasma burners 36 is adjusted such that a continuous melting operation at a maximum voltage (output) is feasible and that the premelt 56 is overheated in the direction towards the overflow weir 14. The plasma burner 40 disposed between the shaft furnace section and the hearth type furnace section transmits its energy to the scrap 28 for one part and to the premelt 56 for the other part so that the latter is overheated in the region of the overflow weir 14, flowing over the overflow weir 14 into the hearth type furnace section 2.

To drain the shaft furnace section 1 for the purposes of inspection, repair or to exchange the bottom anode 39, a tap hole 58 is provided in the bottom 9, which is arranged eccentrically in the tilting plane laid through the center 18 of the shaft furnace section 1. To carry out manipulations in the shaft furnace section 1, a door may be provided, or any manipulation is carried out through the openings 35 in the shell 34 through which the plasma burners 36 are led.

To adjust a desired carbon content in the premelt 56, solid carbon carriers are added to the charge. If 35 kg coke are added per ton of metallic scrap charge, a premelt having the analysis 1.5% carbon, 0.2% silicon, 0.5% manganese, 0.040% phosphorus and 0.050% sulfur will be continuously obtained, which is transfered into the hearth type furnace section 2 at a temperature of from 1,480° to 1,520° C. The temperature control in the shaft furnace section 1 may be realized by switching on the natural-gas oxygen burners 57. As soon as half the bath depth has been reached in the hearth type furnace section 2 (about 20 tons), the carbon is refined by the addition of 25.4 $Nm^3$ oxygen per ton of melt. By the addition of 20 kg lime and 2 kg fluorspar per ton of melt, a final analysis of 0.15% carbon, 0% silicon, 0.20% manganese, maximally 0.020% phosphorus and about 0.040% sulfur is obtained. The formed slag rich in phosphorus runs off through the working door 52 of the hearth type furnace section 2 as soon as the melt is high enough there. The temperature is adjusted to 1700° C. by the additional supply of electric energy and the melt is tapped through the bottom tap 49 free of slag by tilting the aggregate 3 as soon as the weight of the melt in the hearth type furnace section 2 has attained 40 tons as a maximum. Finishing of the melt (deoxidation, further desulphurization and alloying) takes place outside of the hearth type furnace, for instance, during tapping into a ladle.

The carbon monoxide forming during refining is fed to the shaft furnace section 1 and, like the carbon monoxide produced from solid carbon carriers and the oxygen used as plasma gas, is conducted through the column formed by the scrap 28 and is additionally burnt into carbon dioxide in the shaft by feeding additional oxygen.

The feeding of oxygen is effected through oxygen tuyeres 59 arranged in the cylindrical shaft part 24 of the shaft furnace section 1. They are positioned approximately half a meter above the junction of the lower part 34.

The plant according to the invention provides for a continuous process of melting scrap at a low noise level, because the plasma jets are almost entirely surrounded by scrap. The plasma burners 36 and 40 in turn are well protected from collapsing scrap because of their disposition on the diverging lower part 34 of the shaft furnace section 1 laterally of the scrap column. The plant according to the invention allows for a low load on the mains.

With melting outputs to be compared to those of a high-performance electric arc furnace (about 40 t/h finished liquid steel), the mains are substantially less loaded by the plasma burners 36, 40, of the shaft furnace section 1 and the low electric power input necessary for the overheating rotary current electric arc heater 41 in the hearth type furnace section 2 than with a high-performance electric arc furnace of equal melting output.

With the plant according to the invention, a continuous heat transfer by radiation of the plasma jets to the oncoming scrap occurs; hence result high plasma burner and cathode service lives, because the scrap position remains substantially the same, no steel and slag splashes reach the plasma burners and only few ignition procedures take place.

The plant according to the invention has a very good energetic efficiency, which results from the preheating of scrap due to thermal utilization of the offgases, from slight temperature losses due to the low operation temperature in the shaft furnace section 1, from slight flaming losses due to the completely closed aggregate, from the flavorable CO afterburning and the largely continuous process. By the preheating of scrap by means of the offgases, combustible scrap impurities, such as oil, will be burnt off and existing water will be evaporated.

In the following, a material and energy balance per ton of molten crude steel as may be obtained by the plant according to the invention is indicated.

| | Material balance: |
|---|---|
| Scrap | 1050 kg |
| Lime | about 40 kg |
| Carbon | 30 kg = 35 kg coke |
| Electric energy | 400 kWh |
| Ar for plasma burner | 2.5 $Nm^3$ |
| $O_2$ for plasma burner | 15.0 $Nm^3$ |
| $O_2$ for natural gas - oxygen burner | 2.5 $Nm^3$ |
| $O_2$ for afterburning | 27.0 $Nm^3$ |
| $O_2$ total | 44.5 $Nm^3$ |
| Natural gas for natural-gas - oxygen burners | 6.0 $Nm^3$ |
| Offgas amount | 58.0 $Nm^3$ |

| Heat balance: | | | |
|---|---|---|---|
| Heat supply: | | | |
| Electric energy | | | 400 kWh |
| Reaction heat: | 12 kg C = | 30 kWh | |
| (in scrap): | 2 kg Si = | 17 kWh | |
| | 3 kg Mn = | 6 kWh | 53 kWh |
| C combustion | 18 kg $O_2$ + 13.5 kg C | | 36 kWh in shaft part |
| ($O_2$ plasma burner with C coke) | | | for scrap to CO |
| Natural-gas - oxygen burner 6 $Nm^3$ natural gas | | | 60 kWh |
| Utilization of offgas heat t 900° C. from: | | | |
| argon | | 2.5 $Nm^3$ | |
| combustion gases | | 25.0 $Nm^3$ | |
| refining gases | | 22.0 $Nm^3$ | |
| Offgases of natural-gas - oxygen burners | | 8.5 $Nm^3$ | |
| Total | | 58.0 $Nm^3$ | 18 kWh sensible heat |
| Afterburning CO in shaft used by 50% | | | |
| combustion gases | | 25.0 $Nm^3$ | |
| refining gases | | 22.0 $Nm^3$ | |
| Offgases natural-gas - oxygen burners | | 8.5 $Nm^3$ | |
| Total | | 55.5 $Nm^3$ | 98 kWh |
| | | (70 kg) | 665 kWh |
| Thermal output per ton of molten crude steel: | | | |
| Steel heat 1640° C. | | | 411 kWh |
| Slag heat 100 kg/t | | | 55 kWh |
| Offgas loss 58 $Nm^3$ 900° | | | 18 kWh |
| Cooling water losses | | | 70 kWh |
| Surface losses | | | 13 kWh |
| Flaming losses | | | 21 kWh |
| | | | 588 kWh |
| Thermic efficiency My 411/588 = 70% | | | |
| Melting output of burners | | | 4 × 10 t/h |
| Size of charge | | | 40 t (variable) |
| Melting sequence | | | 1 hour |

What we claim is:

1. In a plant for producing steel from scrap, wherein an aggregate furnace construction is employed comprised of a shaft furnace section integrally connected to a hearth type furnace section, said shaft furnace defining a first interior with a bottom for receiving a liquid sump of premelt, said first interior communicting with a second interior defined by said hearth type furnace section which has a bottom into which said premelt is transferable, the improvement wherein:

said shaft furnace section is comprised of an upper portion for receiving scrap and for supporting it as a column, said upper portion extending downwardly and diverging outwardly to provide a lower portion of said shaft furnace having a frustoconical configuration, first heating means comprising a plurality of plasma burners spaced peripherally around said frustoconical lower portion each of said burners entering laterally into said shaft furnace section and directed downwardly towards the column of steel scrap supported within said furnace section, the hearth of said hearth type furnace being contiguous with and a lateral extension of the sump part of said shaft furnace section, and at least one electrically operable second heating means extending into the hearth of said hearth type furnace section to further heat said premelt transferred from the sump part of said shaft furnace section.

2. A plant as set forth in claim 1, wherein said at least one second heating means is an electric arc aggregate.

3. A plant as set forth in claim 1, further comprising an overflow weir disposed between the sump part of said shaft furnace section and the hearth of said hearth type furnace section.

4. A plant as set forth in claim 1, wherein the bottom of said hearth type furnace section is deeper than the bottom of said shaft furnace section.

5. A plant as set forth in claim 3, wherein each of said plurality of plasma burners of said shaft furnace section is adapted to be axially displaced and pivoted, and wherein an additional plasma burner is provided directed towards the region of said overflow weir.

6. A plant as set forth in claim 5, wherein said additional plasma burner is inclined at an angle of from 50° to 80°.

7. A plant as set forth in claim 6, wherein said additional plasma burner is inclined at an angle of 70°.

8. A plant as set forth in claim 1, wherein said shaft furnace section and said hearth type furnace section as an aggregate is tiltable perpendicular to a horizontal axis connecting the center of said shaft furnace section with the center of said hearth type furnace section.

9. A plant as set forth in claim 8, further comprising tilting cradles to accommodate said aggregate.

10. A plant as set forth in claim 8, wherein said hearth type furnace section further comprises a side wall, a bottom tap for said steel arranged eccentrically in a tilting plane disposed through the center of said hearth type furnace section, a working door being provided in said side wall for extracting slag.

11. A plant as set forth in claim 1, further comprising oxygen lance means adapted to be introduced into said hearth type furnace section to blow in refining oxygen.

12. A plant as set forth in claim 1, wherein said first interior of the lower part of said shaft furnace section has a circular cross section and the second interior of said hearth type furnace section also has a circular cross section, and wherein said first interior is approximately tangent to said second interior in plan view, the transition from said first interior to said second interior being more narrow than either of the interiors.

13. A plant as set forth in claim 1, wherein said first interior of the lower part of said shaft furnace section has circular cross section and the second interior of said hearth type furnace section also has a circular cross section, said first interior slightly intersecting with said second interior in plan view, the transition from said first interior to said second interior being more narrow than either of the interiors.

* * * * *